Aug. 2, 1966            O. C. KLEIN            3,264,229
METHOD OF MAKING CONDUCTIVE ZINC OXIDE
Filed Feb. 10, 1964
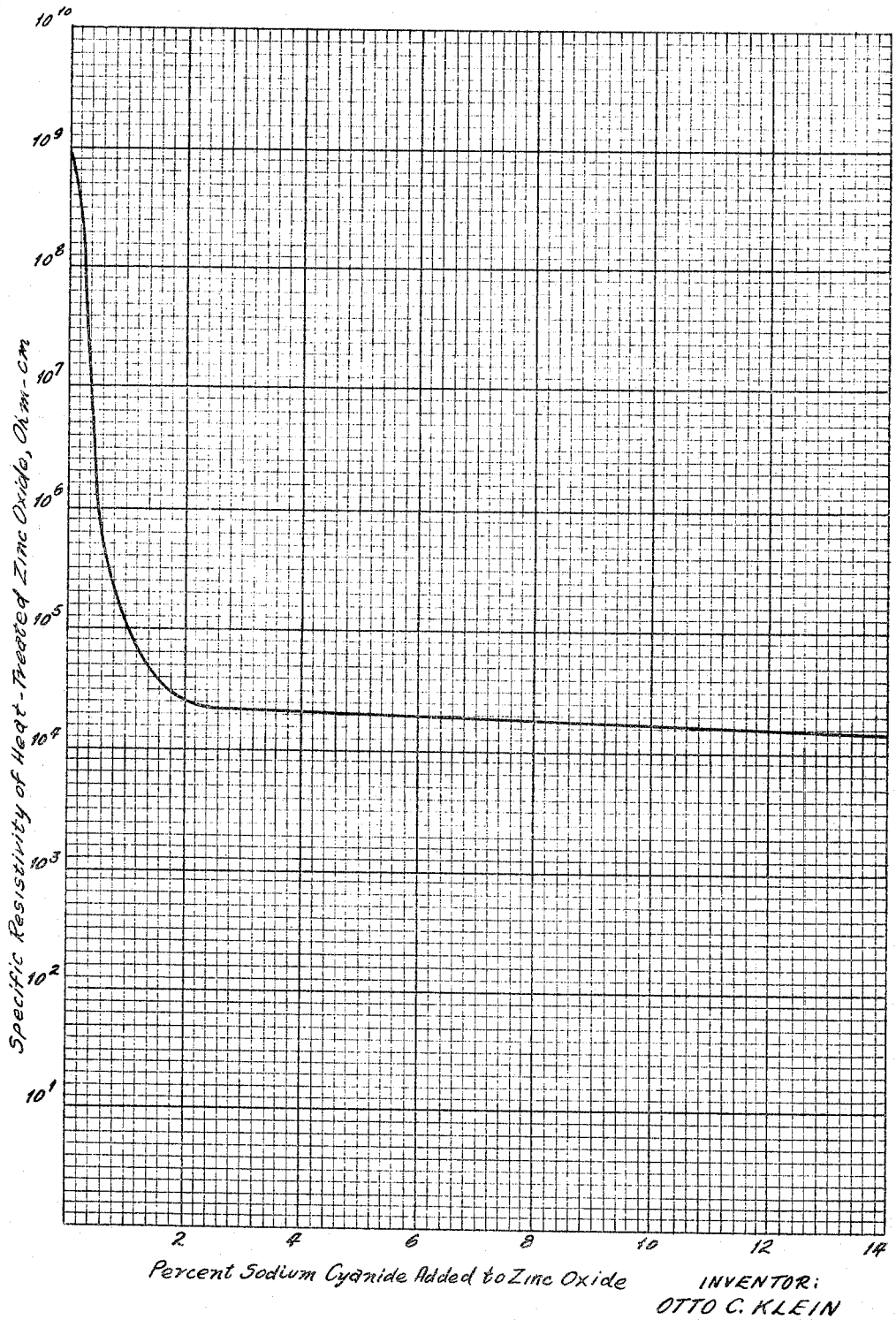
INVENTOR:
OTTO C. KLEIN

United States Patent Office 3,264,229
Patented August 2, 1966

3,264,229
METHOD OF MAKING CONDUCTIVE ZINC OXIDE
Otto C. Klein, Collinsville, Ill., assignor to American Zinc, Lead and Smelting Company, St. Louis, Mo., a corporation of Maine
Filed Feb. 10, 1964, Ser. No. 343,863
13 Claims. (Cl. 252—518)

This invention relates to the preparation of zinc oxide with improved electrical conductivity. It has particular application to the preparation of pigment grade zinc oxide.

The paper industry has for many years used pigments as fillers. In order to produce a sheet having superior whiteness, white pigments are used in the paper or in a coating mix. Pigments such as zinc sulfide, lithopone, blanc fixe, whiting, zinc oxide, titanium dioxide and clay have all been used for this purpose and do indeed impart whiteness to the sheet. All of the above pigments, however, have a high electrical resistivity, and the use of such pigments results in the production of a sheet which is extremely resistant to the flow of an electric current.

The paper industry has a rapidly-increasing need for a pigment which has the dual qualities of whiteness and electrical conductivity. The several advantages of a more conductive sheet of paper will become apparent with the realization that static electrical charges normally accumulate on paper sheets when they are collated or sorted at high speed. The static charges cause the sheets or cards to adhere to one another, resulting in an improper sorting of data. Many printing or mailing devices operate inefficiently because of the accumulation of static charges upon sheets of paper.

A more conductive base sheet is also advantageous when used as a substrate for an electrophotographic coating. Sheets containing a conductive pigment in the base sheet or in a precoat layer are more electrophotographically sensitive than sheets which do not contain a conductive pigment.

Various methods have been used heretofore to make zinc oxide more conductive, but the processes have either used expensive reagents or have been long and cumbersome. For example, in the U.S. patent to Dalton No. 2,887,632, the zinc oxide is treated with zinc or aluminum formate and subsequently roasted in a neutral or reducing atmosphere. The formate decomposes at the elevated temperature, liberating metallic atoms which contribute to the conductivity of the zinc oxide. The neutral or reducing atmosphere prevents the reoxidation of the zinc atoms. In the U.S. patent to Cyr No. 3,089,856, a two-step operation is outlined. The zinc oxide is first treated with aluminum chloride and then heated in air to 700° C. After cooling and disintegration through a hammermill, the material is reheated to about 800° C. in a reducing atmosphere and cooled to 200° C. or below before exposing it to the ambient atmosphere. The product has a high conductivity, but neither its cost nor its moderate coarseness are acceptable to many of the paper manufacturers. Furthermore, those processes which rely upon the reduction of metals produce a zinc oxide which loses its conductivity when heated in an oxidizing atmosphere.

One of the objects of this invention is to provide a simple, inexpensive method of preparing electrically conductive zinc oxide, which causes little coarsening of the zinc oxide.

Another object is to provide an electrically conductive zinc oxide which has a whiteness comparable to the nonconducting zinc oxide used as filler, and which is stable at elevated temperatures in an oxidizing atmosphere.

Other objects will become apparent to those skilled in the art in the light of the following description.

In accordance with this invention, generally stated, a method is provided for manufacturing a zinc oxide which is as white as that normally used in the trade as a filler or as a component in a coating mix and which has an electrical resistivity substantially lower than the zinc oxide normally used for these purposes. Furthermore, this invention provides for the modification of normal pigment-grade zinc oxide in an operation which is inexpensive and which causes very little coarsening of the oxide. The method can be applied with equal success to zinc oxide made from zinc metal or directly from zinc ore, and can be applied to basic zinc carbonate, which, in the same process, is converted to zinc oxide. In any case, the resultant product is stable when reheated even in an oxidizing atmosphere.

I have found that if a suitable alkali metal compound, such as sodium carbonate, sodium cyanide or sodium formate, is mixed with dry pigment-grade zinc oxide and the mixture is then heated above 600° C. and preferably to about 850° C. in an atmosphere which is preferably air, i.e., oxidizing, but may be inert or mildly reducing, the product so formed is still white in color and the electrical resistivity of the oxide has been reduced from the order of about $10^9$ ohm-cm. to the order of about $10^5$ ohm-cm.

Certain anions do not produce satisfactory results. Chlorides, for example, require the use of an impractical amount of the salt, and the zinc oxide produced has a specific resistivity higher by a different order of magnitude than the zinc oxide produced by the preferred salts listed above.

It is also essential to the process of this invention that the zinc compound be relatively pure, i.e., at least 96% and preferably 98%. Furthermore, it is undesirable in the cooling step of the present process to quench the heated treated zinc oxide in water. Such a quenching markedly decreases the electrical conductivity of the treated zinc oxide. However, once cooled, the electrically conductive zinc oxide of this invention can be used in a paper-making process in which it is added to an aqueous slurry, with eminently satisfactory results. The paper exhibits the desired anti-static properties achieved by the use of prior art electrically conductive zinc oxide but at the same time it exhibits the brightness characteristic of paper containing untreated zinc oxide, which the prior art conductive zinc oxide fails to provide.

The following examples are merely illustrative.

EXAMPLE I

One thousand grams of American-process pigment zinc oxide was mechanically mixed with ten grams of sodium cyanide, and the mixture was heated in an uncovered dish to 850° C. for a period of one hour. After cooling to room temperature in the ambient atmosphere, the zinc oxide was tested for specific resistivity and found to measure $8 \times 10^4$ ohm-cm.

EXAMPLE II

One thousand grams of American-process pigment zinc oxide was mechanically mixed with twenty grams of sodium carbonate, and the mixture was heated in an uncovered dish to 850° C. for a period of one hour. After cooling to room temperature in the ambient atmosphere, the zinc oxide was tested for specific resistivity and found to measure $10 \times 10^4$ ohm-cm.

The graph of FIGURE 1 shows how the resistivity of the zinc oxide drops rapidly as the amount of alkali compound increases. In the case of sodium cyanide the economically optimum addition is usually 0.5 to 2.0%.

These figures are a little higher for some of the other alkali compounds listed above.

As the following example illustrates, commercial basic zinc carbonate can be converted to conductive zinc oxide.

EXAMPLE III

One thousand grams of commercial grade basic zinc carbonate was mechanically mixed with ten grams of sodium cyanide, and the mixture was heated in an uncovered dish to 850° C. for a period of one hour. After cooling to room temperature in the ambient atmosphere the zinc oxide so formed was found to have a specific resistivity of $10 \times 10^4$ ohm-cm.

The compounds of Group I elements cited above all tend to decompose at a temperature achieved by the material in the heating process. It is believed that during the decomposition step the dispersion of the alkali oxide is improved by the mechanical decrepitation of the activating compound or by the temporary extrainment of the alkali oxide by the gases released. Compounds that do not decompose during the heat treatment are much less effective than those that do.

The following is an example of the use of an unsatisfactory salt of a Group I element.

EXAMPLE IV

One thousand grams of American-process pigment zinc oxide was mechanically mixed with 150 grams of potassium chloride and the mixture was heated in an uncovered dish to 850° C. for a period of one hour. One half of the mixture was quenched in water, filtered, and dried. The other half of the mixture was cooled to room temperature in an ambient atmosphere. The sample quenched in water was tested for specific resistivity and found to measure $1.5 \times 10^8$ ohm-cm., and the air quenched sample measured $3.0 \times 10^6$ ohm-cm.

The specific resistivity of the zinc oxide, treated and untreated, measured as follows:

A ten-gram sample of zinc oxide was compressed to 8,000 pounds pressure (gauge) using a ten ton Carver "Model B" laboratory press and a standard 1⅛″ Carver test cylinder. Silver paint was next applied so as to make a center contact of 8.0 mm. diameter, and a guard ring of silver paint was applied so as to give a spacing of 8.0 mm. between the two contacts. The specimen was then dried for 30 minutes at 110° C. to remove the organic solvent in the silver paint, and the specimen was positioned under weight-loaded silver electrical contacts. Using a General Radio Type 1230–A electrometer, the specific resistivity was measured while the specimen was held at 50% R.H. at 79° F. Untreated pigment-grade zinc oxide will usually exhibit resisitivty of $1 \times 10^9$ ohm-cm., while my specially treated zinc oxide will usually measure 4 to $12 \times 10^4$ ohm-cm.

In the range of heating temperatures of 650°–800° C., the salts produce a marked reduction in resistivity, but heating the mixture to about 850° C. seems to improve the stability of the product.

While it has been found that the process of this invention is still effective in a mildly reducing atmosphere (e.g. 2% CO), it is at least as effective in air, and there seems no point to providing a special reducing atmosphere.

In mixing the zinc compound and salt together, it is desirable to obtain as uniform distribution as possible. However, apparently because of the decomposition of the salt, it has been found that the treated product is uniform even though it is manifestly impossible to have completely uniform initial distribution of the salt with respect to the individual particles of zinc compound.

The uniformity and effectiveness of the product of this invention have been affirmed during the trial of several tons of the product in the manufacture of paper.

Having thus described the invention, what is claimed and desired to be secured by Letters Patent is:

1. The method of making electrically conductive zinc oxide comprising mixing with a pigment zinc oxide of a purity of at least 96% and a specific resistivity of at least $10^8$ ohm-cm., a salt the cation of which is taken from the group consisting of sodium, potassium and lithium and the anion of which is taken from the group consisting of cyanate, cyanide, thiocyanate, hydroxide, formate, carbonate and bicarbonate, said salt being present in an amount less than ten percent by weight of said zinc oxide; subsequently heating the mixture to a temperature above 650° C. and below the sintering temperature of the zinc oxide, in an atmosphere within the range from mildly reducing to oxidizing until at least partial decomposition of said salt has occurred, and cooling said zinc oxide.

2. The method of making electrically conductive zinc oxide comprising mixing with a pigment zinc oxide of a purity of at least 96% and a specific resistivity of at least $10^8$ ohm-cm., a salt the cation of which is taken from the group consisting of sodium, potassium and lithium and the anion of which is taken from the group consisting of cyanate, cyanide, thiocyanate, hydroxide, formate, carbonate, and bicarbonate, and which decomposes below about 900° C., said salt being present in an amount less than ten percent by weight of said zinc oxide; subsequently heating the mixture above the decomposition temperature of the salt for a time sufficient to cause decomposition of a substantial amount of said salt, in an atmosphere within the range from mildly reducing to oxidizing, and thereafter cooling said zinc oxide.

3. The method of making electrically conductive zinc oxide comprising mixing with a zinc compound taken from the group consisting of zinc oxide and basic zinc carbonate capable of conversion by heat to zinc oxide of at least 96% purity, a salt the cation of which is taken from the group consisting of sodium, potassium and lithium and the anion of which is taken from the group consisting of cyanate, cyanide, thiocyanate, hydroxide, formate, carbonate, and bicarbonate, and which decomposed below about 900° C., said salt being present in an amount less than ten percent by weight of the zinc compound calculated as zinc oxide; subsequently heating the mixture above the decomposition temperature of the salt and the conversion temperature of said zinc compound to zinc oxide, in an atmosphere within the range from mildly reducing to oxidizing for a time sufficient to convert said zinc compound to zinc oxide and to cause decomposition of a substantial amount of said salt, and thereafter cooling said zinc oxide.

4. The method of making electrically conductive zinc oxide comprising mixing with a compound taken from the group consisting of zinc oxide and basic zinc carbonate capable of conversion by heat to zinc oxide having a purity of at least 96%, a salt the cation of which is taken from the group consisting of sodium, potassium and lithium and the anion of which is taken from the group consisting of cyanide, cyanate, thiocyanate, hydroxide, formate, carbonate and bicarbonate, said salt being present in an amount less than ten percent by weight of said compound calculated as zinc oxide; subsequently heating the mixture to a temperature above 800° C. for a time sufficient to ensure that the zinc compound is zinc oxide and that a substantial amount of the salt is decomposed, in an atmosphere within the range from mildly reducing to oxidizing, and thereafter cooling said zinc oxide.

5. The method of making electrically conductive zinc oxide comprising mixing, with a compound taken from the group consisting of zinc oxide and basic zinc carbonate capable of conversion by heat to zinc oxide having a purity of at least 96%, a salt taken from the group consisting of sodium cyanide, said salt being present in an amount less than 10% by weight of the zinc compound calculated as zinc oxide, potassium cyanide and lithium cyanide, and subsequently heating the mixture in an atmosphere within the range from mildly reducing to oxidizing to a temperature above 800° C. for a time sufficient to ensure that the zinc compound is zinc oxide and that said salt is decomposed.

6. The method of making electrically conductive zinc oxide comprising mixing sodium cyanide with zinc oxide having an electrical resistivity of at least $10^8$ ohm-cm., said sodium cyanide being present in an amount less than 10% by weight of the zinc oxide, heating said mixture in an atmosphere within the range from mildly reducing to oxidizing to a temperature on the order of 850° C., for about an hour, and cooling said zinc oxide.

7. The method of making electrically conductive zinc oxide comprising mixing with a pigment zinc oxide of a purity of at least 98% and a specific resistivity of at least $10^8$ ohm-cm., a salt the cation of which is taken from the group consisting of sodium, potassium and lithium and the anion of which is taken from the group consisting of cyanide, cyanate, thiocyanate, hydroxide, formate, carbonate and bicarbonate, said salt being present in an amount less than 10% by weight of said zinc oxide; subsequently heating the mixture to a temperature within the range of about 800° to 900° C. until at least partial decomposition of said salt has occurred, and cooling said zinc oxide.

8. The method of making electrically conductive zinc oxide comprising mixing basic zinc carbonate convertible by heat to zinc oxide having a purity of at least 96%, a salt the cation of which is taken from the group consisting of sodium, potassium and lithium and the anion of which is taken from the group consisting of cyanide, cyanate, thiocyanate, hydroxide, formate, carbonate and bicarbonate, said salt being present in an amount less than 10% by weight of the basic zinc carbonate calculated as zinc oxide; subsequently heating the mixture to a temperature within the range of about 800° to 900° C. until at least partial decomposition of said salt has occurred, and said basic zinc carbonate has been converted to zinc oxide, and cooling said zinc oxide.

9. The method of making electrically conductive zinc oxide comprising mixing, with a compound taken from the group consisting of zinc oxide and basic zinc carbonate capable of conversion by heat to zinc oxide having a purity of at least 96%, a salt taken from the group consisting of sodium carbonate and sodium bicarbonate, subsequently heating said mixture to a temperature above 800° C., in an atmosphere within the range from mildly reducing to oxidizing, until at least partial decomposition of the salt has occurred and to ensure that the zinc compound is zinc oxide, and thereafter cooling said zinc oxide.

10. The method of making electrically conductive zinc oxide comprising mixing zinc oxide of a purity of at least 98% and a specific resistivity of at least $10^8$ ohm-cm. with .5–3% by weight of sodium cyanide, heating the mixture in air to a temperature of between 800 and 900° C. until at least partial decomposition of the sodium cyanide has occurred, and thereafter cooling the treated zinc oxide.

11. The method of making electrically conductive zinc oxide comprising mixing basic zinc carbonate convertible by heat to zinc oxide having a plurality of at least 98%, with between .5–3% by weight of sodium cyanide, heating the mixture in air to a temperature of between 800 and 900° C. until the basic zinc carbonate is converted to zinc oxide and cooling the treated zinc oxide.

12. The method of making electrically conductive zinc oxide comprising mixing pigment zinc oxide of a purity of at least 98% and an electrical resistivity of at least $10^8$ ohm-cm. and 1–10% by weight of sodium carbonate; subsequently heating the mixture in air to a temperature of at least 800° C. until the sodium carbonate has decomposed, and cooling the treated zinc oxide.

13. The method of making electrically conductive zinc oxide comprising mixing pigment zinc oxide of a purity of at least 98% and an electrical resistivity of at least $10^8$ ohm-cm. and 1–10% by weight of sodium bicarbonate; subsequently heating the mixture in air to a temperature of at least 800° C. until the sodium bicarbonate has decomposed, and cooling the treated zinc oxide.

References Cited by the Examiner

UNITED STATES PATENTS 3,089,856  5/1963  Cyr et al. _____ 252—518

OTHER REFERENCES

Lander, J.: Physics and Chem. Solids (1960), vol. 15, pp. 324–334.

LEON D. ROSDOL, *Primary Examiner.*

JULIUS GREENWALD, *Examiner.*

J. D. WELSH, *Assistant Examiner.*